Nov. 15, 1955

E. WILBUSHEWICH 2,723,534

METHODS AND MACHINES TO PRODUCE ICE, AND
ICEBLOCKS OBTAINED THEREBY

Filed Sept. 29, 1952

INVENTOR:
EUGEN WILBUSHEWICH

BY A. John Michel

ATTORNEY.

Nov. 15, 1955 E. WILBUSHEWICH 2,723,534
METHODS AND MACHINES TO PRODUCE ICE, AND
ICEBLOCKS OBTAINED THEREBY
Filed Sept. 29, 1952 5 Sheets-Sheet 2
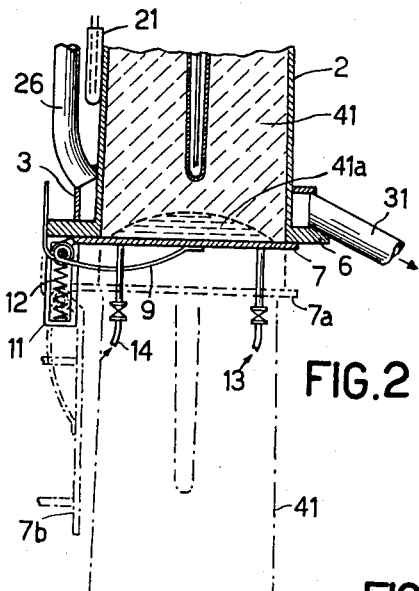
FIG.2
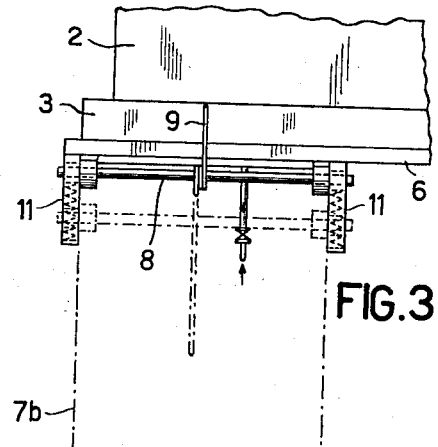
FIG.3
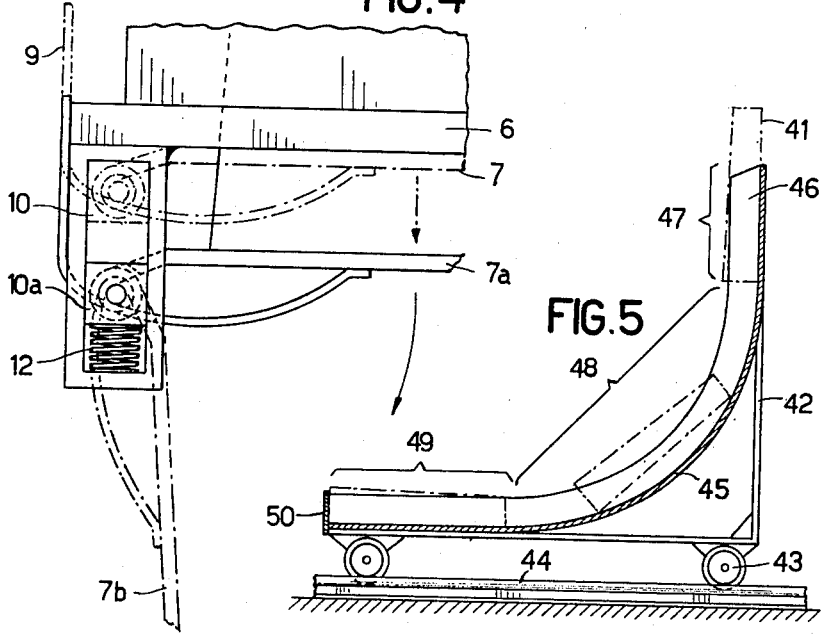
FIG.4
FIG.5
INVENTOR:
EUGEN WILBUSHEWICH
BY A. John Michel
ATTORNEY

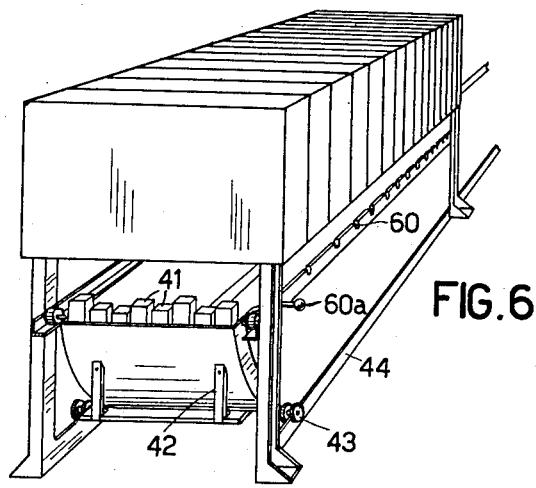
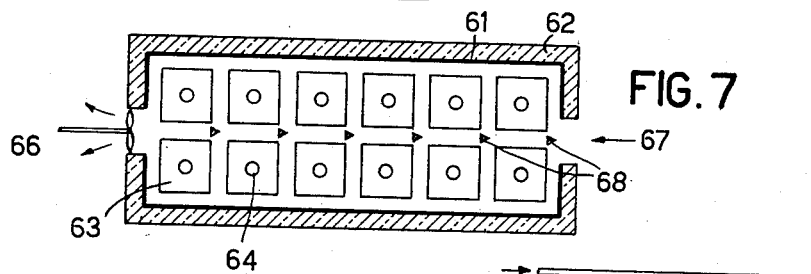
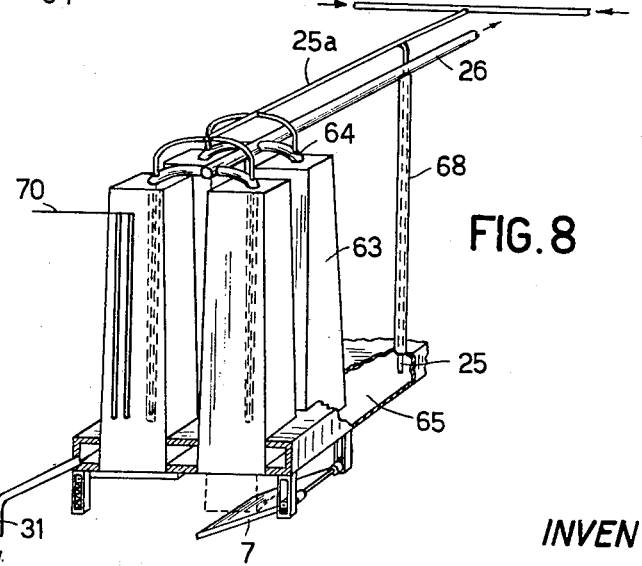

Nov. 15, 1955  E. WILBUSHEWICH  2,723,534
METHODS AND MACHINES TO PRODUCE ICE, AND
ICEBLOCKS OBTAINED THEREBY
Filed Sept. 29, 1952  5 Sheets-Sheet 5

INVENTOR:
EUGEN WILBUSHEWICH
BY A. John Michel
ATTORNEY.

United States Patent Office 2,723,534
Patented Nov. 15, 1955

2,723,534

METHODS AND MACHINES TO PRODUCE ICE, AND ICEBLOCKS OBTAINED THEREBY

Eugen Wilbushewich, Haifa, Israel

Application September 29, 1952, Serial No. 312,058

Claims priority, application Switzerland August 21, 1952

12 Claims. (Cl. 62—7)

The present invention relates to a method for producing ice blocks in generating plants with direct acting refrigerating organs. Such plants generally operate in such a manner that first, in a freezing process, the ice moulds are cooled by means of said refrigerating organs, the formed ice blocks, in a defrosting process, e. g. through circulating warm media in the refrigerating organs, then are detached from the walls of the moulds in order, finally to prepare, after a harvesting process, a new freezing resp. mould-filling process.

Advantages are obtained in the ice generation through internally acting refrigerating organs ranging from above into the ice moulds, and practice has proved that the ice formation at the wall surface of said internal refrigerating organs, is much more effective than that of the walls of an outer refrigerating organ of a corresponding area.

Object of the invention is a method based on these observations, and accordingly, cold media in the freezing process, and warm media in the defrosting process, circulate first through the internal refrigerating organs, before the outer refrigerating organs receive the said media. An ice generating method according to the invention, allows simpler pipework for the refrigerant media and requires less valves which, incidentally, can be of standard construction.

The invention, from one aspect therefore, consists in a freezing method, which employs refrigerating organs in connection with ice moulds, whereby the refrigerant medium enters the internal refrigerating organs before, from there, it is received in outer refrigerating organs; from another aspect, the invention consists in a harvesting method for ice blocks from ice moulds, after a defrosting process, whereby in that case too, the defrosting medium enters the internal refrigerating organs before, from there, it is received in the outer refrigerating organs.

These novel methods for the production of ice blocks, according to the invention, advantageously affect also the harvesting from, and filling of, the ice moulds, by utilizing in these processes, incidentally, further facts connected with the ice formation.

The invention, inter alia, utilizes the following facts:

(a) In square ice moulds, of standard 18 cm. size, one tubular internal refrigerating organ, of 15 mm. outer diameter, will freeze up an ice area about 3½ times larger than that frozen by solely employing outer refrigerating organs surrounding the ice mould, considering unit areas of the walls of said refrigerating organs in both cases.

Outer refrigerating organs, therefore, contribute in a small way only towards the ice formation, especially in cases when, for standard ice block dimensions, several, say five, internal tubular refrigerant evaporators are used, as refrigerating organs.

(b) Ice freezes under volume expansion, yet expanding only in that direction where least obstructions are present. Ice blocks freezing up evenly over the whole length of long-conical moulds will show an elongation towards the wider mould bottom only shortly before the end of the freezing process; the pressure due to the elongation becomes rather strong and is substantially evenly distributed over the cross-sectional area.

(c) Ice films between metal surfaces have high breaking strength and are fluid-tight.

(d) Ice blocks produced by means of refrigerant evaporators acting directly on ice moulds both from the outside and internally, or only internally by using several evaporators, when the ice combines within the mould into a "compound ice block," show increased stability compared with standard ice blocks and have an ice of a character which shows high melt resistance.

(e) Clear ice blocks are effectively obtained, if simultaneously with the admission of water into the ice moulds, through their bottom, degassing occurs by blowing in of air, also through the bottom.

(f) A plurality of tubular refrigerating organs within ice moulds, make it possible to freeze iceblocks from seawater, or from other solutions or juices, with a substantially equal salt concentration, or the like, across the ice block.

Whenever the invention speaks of refrigerating organs or of media used therein, also those are meant to be included where e. g. a liquefiable gaseous refrigerant medium is made to circulate in known manner and can evaporate through heat exchange in evaporators, when, with the aid of a compressor with oil separator, condenser, etc. a refrigeration circuit is being established.

The invention makes it possible that, within short freezing periods, better iceblocks than hitherto can be obtained and that, for equal production, ice generating plants now require less material in simpler constructions; furthermore, the invention improves and renders highly efficient automatic plants for continuous ice block production.

Ice generating plants advantageously employ apart from the above mentioned main features, a number of further essential characteristics, and the resulting ice blocks, too, show novel characteristics. These novel and important features, are in greater detail described with reference to various examples and the accompanying drawings where several embodiments are illustrated. However, these examples shall not restrict the scope of the invention as it is outlined and claimed in the attached claims.

Fig. 1 shows a sectional view along an ice mould, in connection with arrangements for the automatic ice block generation and harvesting;

Figs. 2 and 3 give fragmentary elevations, in 2 views, of the lower part of the ice mould;

Fig. 4 illustrates details of the hinge construction for the movable mould bottom;

Fig. 5 gives an embodiment for an ice block receiving trolley, with deflector curve for the ice blocks when harvested;

Fig. 6 shows the trolley of Fig. 5, in collaboration with several mould batteries;

Figs. 7 and 8 are diagrammatical views of a mould battery, a horizontal sectional and a perspective view, to illustrate a freezing and defrosting process;

Figure 1:
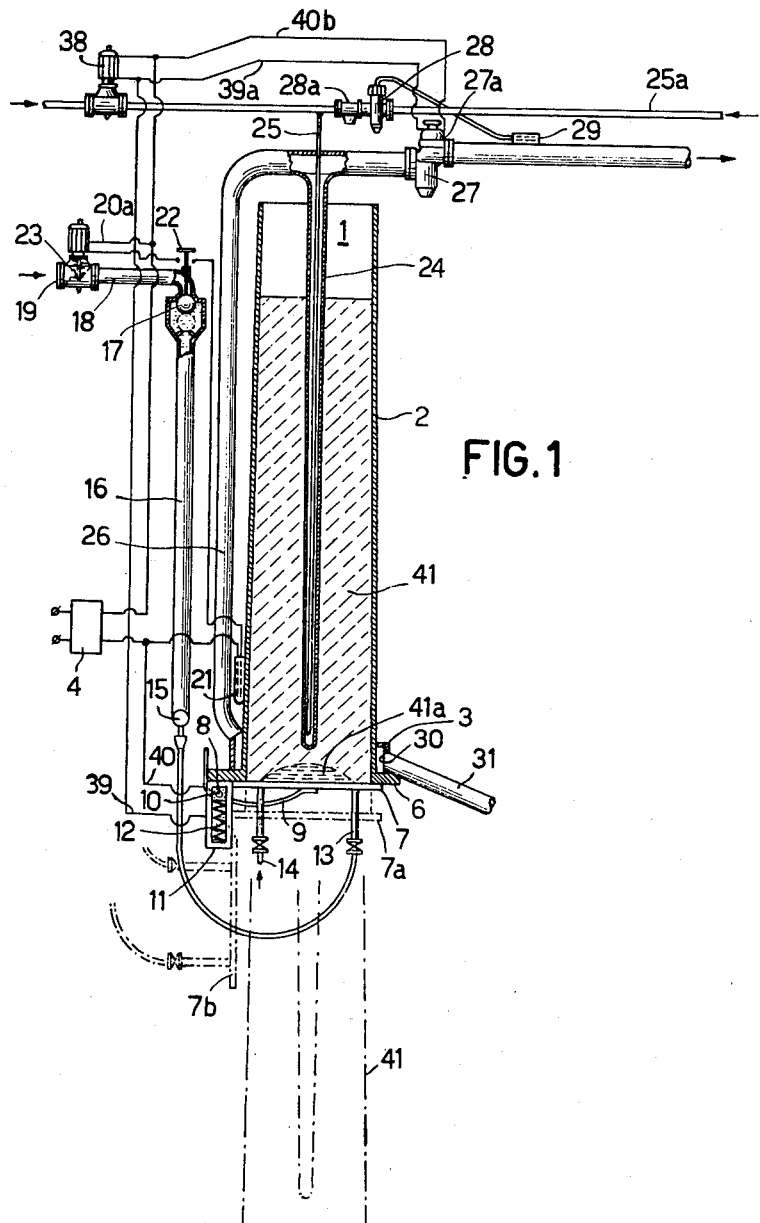

Referring first to Figs. 1–3, 1 denotes an upright ice mould, preferably of square cross section and slightly diverging towards the bottom. The ice mould is surrounded, near its bottom end, by a jacket chamber 3 which serves as an outer evaporator chamber and the lower wall of which is the bottom flange 6 of the mould. To the bottom edge of the mould is fitted a bearing housing 11 for a movable bottom plate 7. The plate 7, by means of a spindle 8, is pivoted in a bush 10 and apart from the shown upper position it can, as drawn in dot-dash fashion, also adopt a tilted position 7b as well as a lower position 7a. A lowering is made possible as a vertically move in the through the bush 10 which can vertically move in the oblong bearing housing into the lower position 10a (Fig. 3). The upper position of the bottom plate 7 is attained through springs 9 and 12, the forces of which control the tilting back and lifting of the plate so that, with the mould empty, the plate will lean lightly and not necessarily fluid tight, against the flange 6.

A tubular refrigerant evaporator 24 ranges from the top into the ice mould 1. It is slightly tapered towards its end and is arranged coaxially to the mould, ending somewhat near the bottom plate 7. This internal evaporator, as tube 24 may be called, connects to the jacket evaporator 3 by means of an outer pipe 26. This pipe 26, to the right, leads to the suction side of a compressor of the refrigeration plant, not shown, via a solenoid regulating and stop valve 27, 27a. The plug of valve 27a is kept open when the solenoid is de-energized.

Concentrically to, and almost along the whole length of the internal evaporator tube 24, which is closed at its bottom end, is arranged a tube 25 which is open at its bottom end and which on top, leads to a pipe 25a.

Via this pipe 25a, on the one hand from the right and a regulating valve 28 with check valve 28a, liquefied refrigerant can enter during a freezing process.

The pipe 25a, on the left, includes a solenoid valve 38, and on the other hand from the left, warm refrigerant media can enter the pipe 25, during a defrosting process; the plug of valve 38 is normally, with the solenoid de-energized, held closed through spring pressure.

The outer evaporator 3 connects, at 30, to a pipe 31 leading to a not shown refrigerant receptacle.

When several ice moulds are combined into a mould battery, the outer evaporator 3 can be made common to all the moulds, when also the entry pipe 26 and exit pipe 31 are common. The above mentioned valves, too, are common for a mould battery.

The ice mould, or moulds of a battery, are filled with liquid 41 from an admission pipe 16. The distribution of liquid to the various moulds is done through a manifold tube 15 and flexible hoses, connected to nozzles 13 in the bottom plates 7. Another nozzle 14, in each bottom plate, is used to let in air, when clear ice is to be produced.

The admission pipe 16 has on top, a float valve 17, which is placed level with the liquid level of the moulds so as to close the valve when this level is reached. Liquid, for instance water, is supplied via valve 19 which is connected through pipe 18 with the float valve 17. This valve 19 can be opened electromagnetically, the energization overcoming the closure spring 23 of the valve plug.

The ice mould, or ice mould battery, is mounted on a stand and at a certain distance from the floor, so that an ice block emerging under gravity force, as shown in dot-dash fashion, can readily be harvested.

In contact with the mould wall, is a thermostat 21. This thermostat closes an electric contact when the freezing temperature for the mould is reached. The float valve 17 in its lower position also closes a contact 22. The emergence of the ice block from the mould, drawn in dotted lines, before it is harvested, closes another contact, not shown, to electrically connect the lines 39 and 40.

The solenoids of the valves 19, 38, and 27a lie in electric circuits to be described below, supplied by a current source 4.

The regulating valve 28 works in conjunction with a thermostatic member or bulb 29, which is in contact with the pipe 26 leading to the suction side of the compressor. This arrangement regulates the flow of liquefied refrigerant, during the freezing process, to the evaporators, entering from the right of the pipe 25a.

The valves 38 and 27a are simply shown paralleled by lines 39a, 40b. Their solenoids will therefore work, when the lines 39, 40 are electrically connected through the not shown contact, in a way that the valve 38 is actuated to open whilst simultaneously valve 27a, is actuated to close. In actual practice of course, when solenoid valve types are used that only open upon energization, an intermediate relay can provide for the opposing valve actuation, as was described. This relay can be of the slow type.

In Figs. 1 and 2, a zone 41a at the bottom end of the ice block 41 is indicated. This zone represents not frozen liquid which remains till shortly before the completion of the ice block formation, as will be described below. The final freezing up also of this zone 41a, results in an elongation of the ice block 41 towards the bottom, and as indicated in Figs. 1 and 2 in dot-dash fashion, the plate 7 is then shifted parallel. The pressure due to this elongation is large and tears open an ice film between mould bottom 7 and mould flange 6 which was formed right at the beginning of the freezing process.

Instead of the illustrated lowering into the shifted position 7a through employing a sliding bush 10 in the bearing housing 11, also a relatively thin, springy bottom plate can be used, which is elastically dished under the influence of the pressure exerted by the elongation of the ice, so that in this case a plain hinge, or bearing, can be used and the springs 12 omitted.

Figs. 7 and 8 give diagrammatical-cross sectional and fragmentary-perspective views of a mould battery, comprising several moulds. In Fig. 7, 62 denotes a heat insulating layer which is applied to walls 61 for the mould battery surrounding the ice moulds 63 at a certain distance. 64 denote the internal evaporators and these can, perhaps via pipes 68, connect to the jacket evaporator 65 which is common to all and surrounds the lower part of each mould. The walls of the moulds 63 are enveloped by a fluid, for instance air, which is made to flow across the mould battery by means of a ventilator 66. The fluid, entering at 67 in the direction of the arrows, will envelop the walls of the individual ice moulds, and will expedite by means of warm fluid the defrosting, by means of cold fluid the freezing processes.

The pipes 68 are preferably so placed that they act as deflectors for the passing fluid to equally envelop all mould walls. Additional means, for instance electrically heated bodies 70 can be provided in order to accelerate the defrosting process. Also, other bodies not shown, and as effective, can be used in the heating up of the defrosting fluid, e. g. the warmed up bodies of either the compressor, oil separator, condenser, or the like, which all work in conjunction with the refrigeration plant.

Instead of arranging the pipes 68 away from adjacent moulds 63, these can be placed in permanent, direct heat-conductive contact with the mould walls. In general, when the said pipes 68 act as connections between the internal evaporators 64 and outer evaporator 65, their respective heat or cold is taken up by the passing enveloping fluid, so as to support either the defrosting or freezing process in the ice moulds. Into the outer evaporator 65, incidentally, can also enter via tube 25, according to the illustration, Figure 8 right, a refrigerant from the supply line 25a, and this entry tube 25 preferably leads concentrically through the connecting pipe 68.

Fig. 8 also shows an ice block in the instant of emergence, after the defrosting also from the bottom plate 7. It is now due to drop down, and plate 7 then will flap back into the upper rest position.

A dropping ice block, or the ice blocks 41 falling away from a mould battery are, as is illustrated in Figs. 5 and 6, collected by a table trolley and can be rolled into a storage room. The table top of the trolley of Figs. 5 and 6 is curved in order to divert, and eventually collect horizontally, the vertically dropping ice blocks. The table 45 of the trolley 42 has for this purpose, after an initial vertical guide section 47, a parabolic shape 48, continuing and ending at 49, horizontally.

The table top is provided with a stop 50 at the horizontal end, and at the side, has guide walls 46. Wheels 43, on rails 44, allow ready rolling. The trolley 42 has a locating lever 60a which cooperates with grooves 60 in the battery stand (Fig. 6), so that as shown in Fig. 5, the trolley will receive and divert horizontally, the ice blocks 41 when they drop from a mould battery. If in an ice generation plant, a row of mould batteries is provided, as is diagrammatically shown in Fig. 6, one trolley 42 can serve all the batteries and accordingly, a corresponding number of grooves 60 is provided in the battery stand to secure an aligned location of the trolley 42 beneath each mould battery.

Figure 12:
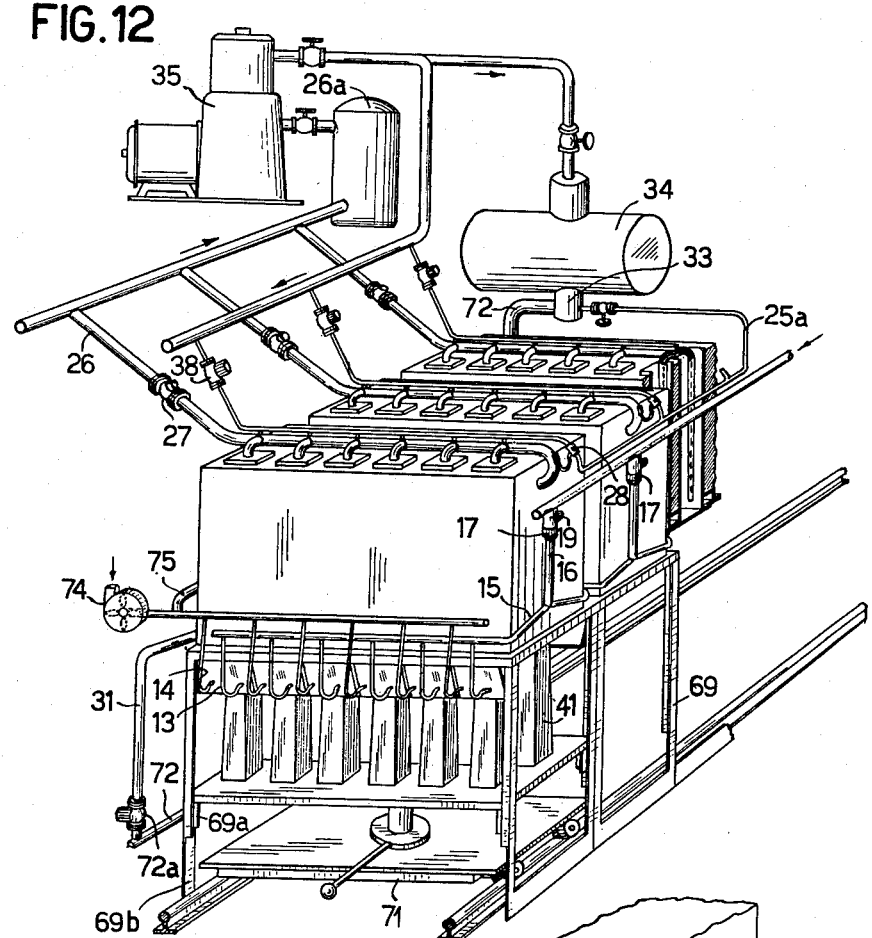
Figs. 12 and 12a show perspectively groups of ice mould batteries, and a variant, in conjunction with a circulating refrigerant, compressor, and condenser, and served by a harvesting trolley.

In Fig. 12, too, an ice generating plant is illustrated composed of several mould battries mounted on a stand 69 at a distance from the floor. Here as well, a common trolley 71 for all mould batteries is provided, which can be moved underneath the row of mould batteries. However, instead of a curved top this trolley comprises a flat table, and has feet 69a which act as guides when the table is lifted and lowered. Whilst moving vertically, the feet 69a of the table collaborate with the battery stand 69 in a manner that proper alignment and positioning is achieved during the harvesting process. Only in the lowered position of the table, due to the flattened parts 69b of the stand 69, will it become possible to roll the trolley horizontally along the rails.

Fig. 12 shows, with the same reference characters as in Fig. 1, a number of mould batteries together with the refrigeration plant, the water supply and, perhaps, air supply. Accordingly, a compressor 35 is indicated and a condenser 34 into which compressed refrigerant flows. The condenser is provided with a receptacle 33 for liquefied refrigerant, and to this receptacle connect on the one hand pipe 25a, and on the other hand a pipe 72. As was described above, pipe 25a serves, during the freezing process, to supply cold refrigerant to the internal evaporators of the individual ice moulds, via a regulating valve 28 which is common to a mould battery. The delivery side of the compressor leads also to the valves 38, common to each mould battery and which, as was described above, can be operated electromagnetically to admit, during a defrosting process, warm refrigerant medium into the internal evaporators.

The suction side of the compressor 35 evacuates the individual mould batteries, during the freezing process, and removes refrigerant via valve 27, pipe 26, and the liquid separator 26a which is common to the entire plant.

During the defrosting process of one or the other battery, liquefied refrigerant medium, drained off by the pipes 31 is carried to the liquid receptacle 33 of the condenser, via the solenoid valves 72a, 72b, or 72c which are common to each mould battery, and the collector tube 72. The said valves can, during the defrosting process of the corresponding mould battery, be opened electromagnetically, in known manner.

Figure 12A:
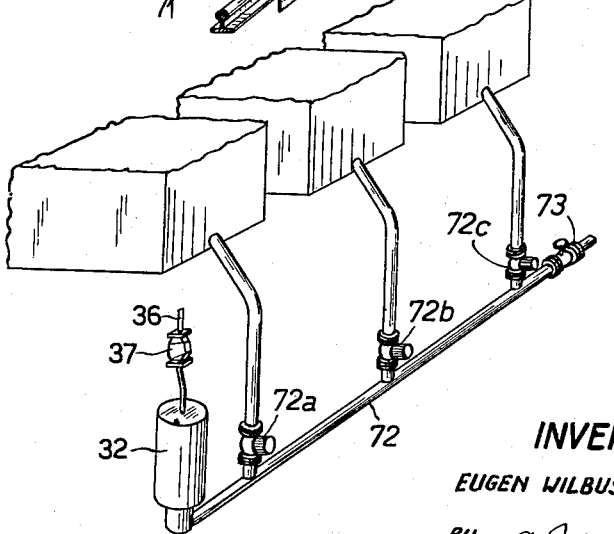

In larger plants, instead of employing the receptacle 33, a separate liquid collector vessel 32 can be provided, as shown in Fig. 12a, which becomes operative during a defrosting process. If liquefied refrigerant enters, any unduly high pressure within the vessel 32 is relieved by a pipe 36 and the adjustable check valve 37, towards the suction side of the compressor 35. A valve 73 allows, also with the arrangement of Fig. 12a, that the collector tube 72 can connect to the liquid receptacle 33.

74 denotes an air compression device which is common to the whole plant, for the supply of air to be blown into the ice moulds, via supply line 75 and the nozzles 14.

Figure 9:
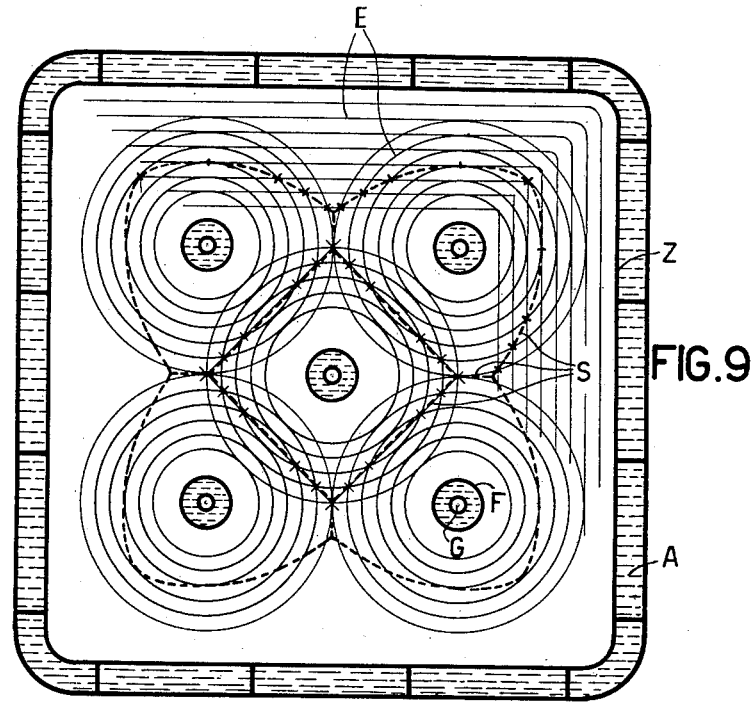
Figs. 9–11 are cross-sectional views of ice blocks.

Fig. 9 shows a section across an ice mould Z, which apart from an outer evaporator chamber A is provided with five internal evaporator chambers. The said internal evaporators F, with their refrigerant entry pipe G, are as is illustrated, disposed symmetrically within the square space of the mould.

Figure 10:
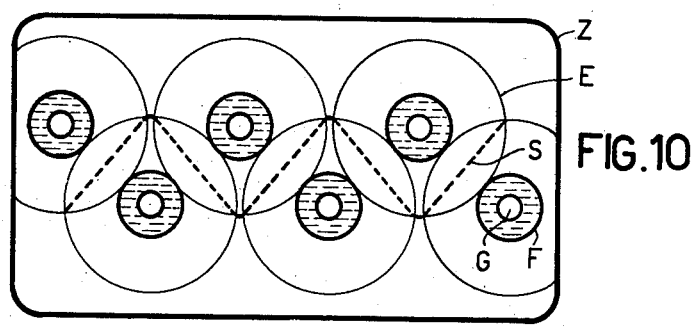
Figure 11:
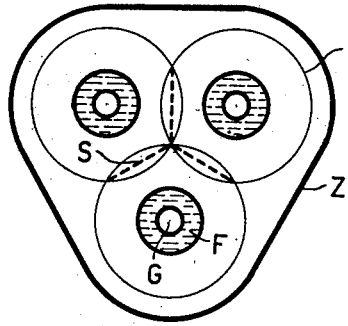

Other cross-sectional views for ice moulds are shown in Figs. 10 and 11, and in Fig. 10 a rectangular iceblock whilst in Fig. 11 a substantially triangular iceblock is formed, without the use of direct acting outer evaporators.

Ice, in known manner, develops stepwise through ice layers E for instance forming at the mould walls and decreasing in circumference towards the ice block centre, whilst those layers formed at the internal evaporator tubes increase in circumference toward the walls (Fig. 9). The ice zones from various internal evaporators, when they meet each other, and those developed through the outer evaporator, create contacting surfaces S, shown dotted in the figures. The lines S, in all the illustrated arrangements, do not run parallel to the edges of the obtained iceblock.

The ice generating plant operates in the following manner:

(a) Filling process

It is presumed that the ice mould 1 had just been emptied, after harvesting of an ice block 41, when the bottom plate 7 was tilted into the position 7b. This harvesting process results in a filling process.

The bottom will flap back into the upper position, governed by the springs 9 and 12, and rests lightly and in no way watertight, against the flange 6 of the lower part of the mould. In this upper position, the electrical contact between lines 39 and 40 which was made during the previous defrosting process, remains open and this results in a switch-over to the freezing process, as will be described below.

Immediately at the start of the freezing process, when cold refrigerant also enters the jacket-evaporator chamber 3, the flange 6 is cooled down to such a degree that the water which is present on the bottom plate 7 is frozen and thus the mould rendered watertight.

Liquid which was retained all during the previous freezing process, in the common admission pipe 16, and the manifold tube 15, can now flow out and, in entering the mould, will wet the mould bottom which, as was described, becomes watertight through freezing onto the flange 6.

As the admission pipe empties itself, the float valve 17 opens, and the contact 22 which is actuated by said valve is closed, to prepare, at one point, the circuit for the solenoid of the supply valve 19. This circuit is completed when another contact, at the thermostat 21, is closed extending then, from the current supply source 4, via the contacts 21 and 22, to the solenoid, and back via line 20a. The thus energized solenoid-valve 19 keeps the water supply on until, upon the pre-set liquid level for the moulds being reached, and through contact 22 then opened again, it is automatically shut off again. This admission control guarantees an automatic filling of all moulds of a battery to the same level.

The admission of liquid to the ice moulds 1, through the nozzle 13 of the bottom plate 7, is at a controlled rate. Simultaneous with the admission of water to the mould, through its bottom, and also after the termination of the filling process, air which is supplied from a common air compression device (74, Fig. 12) can be blown in, through the nozzle 14 in the mould bottom. This arrangement is rather effective in degassing the water for the purpose of eventually obtaining a clear ice block.

(b) Freezing process

The freezing process which had been started together with the filling process, will continue until the completion of an ice block 41. The ice development is mainly due to the internal evaporator 24, into which with valves 28, 28a open, liquefied refrigerant, for instance ammonia, is introduced via pipe 25a.

This refrigerant medium is led, through the entry pipe 25, till near the bottom of the evaporator tube 24, and from there, it flows via the suction pipe 26, the valves 27, 27a, to the suction side (right) of the ammonia compressor.

The liquefied refrigerant medium evaporates in the tube 24, through heat exchange with the liquid in the mould; the refrigerant, from the tube 24 is led, via the outer pipe 26, also to the outer evaporator 3.

The ice formation is particularly effective through increasing ice zones developing round the internal evaporator 24. Finally, the ice will fill up almost the entire space of the ice mould, under expansion, or elongation, in the process of freezing up. The elongation, however so far, is not directed downward. At the lower end of the ice block, only right at the end of the freezing up of the block, also zone 41a can freeze. This zone will during the freezing process, freeze up last due to the internal evaporator 24 not reaching far enough to the mould bottom 7 and because the outer evaporator has not yet developed ice to reach the centre. In the very final stage of the freezing process this zone 41a too will freeze up, causing an elongation towards the bottom. After tearing away the bottom 7 from the flange 6 to which it had been frozen, the said elongation will initiate the defrosting process.

(c) Defrosting process

The downward elongation, or stretching, of the ice causes an electrical contact between lines 39 and 40, and a current to flow from the current supply 4 over the solenoid valves 27a and 38, paralleled by means of the lines 39a, 40b, actuating them so that valve 27a is shut whilst valve 38 is opened.

Instead of the cold, liquefied refrigerant medium which over pipe 25a had flowed into the entry pipe 25, now warm refrigerant will flow, from the left, through the now open valve 38 into the same entry pipe 25 of the internal evaporator 24.

This warm refrigerant medium runs inside along the internal evaporator tube 24 heating up the evaporator walls, also of the outer evaporator which receives the warm refrigerant via the connection pipe 26. Any refrigerant which has collected in the outer evaporator chamber will, over pipe 31 and a valve (e. g. 72a, Fig. 12) which is open during the defrosting process, be drained into a collector vessel. In Fig. 12, this vessel 33 is the one built with the condenser 34; in Fig. 12a, it is a separate collector vessel 32.

Simultaneously with the changing over of the valves, to heat up the walls of the evaporators, other means are put into operation, as indicated in Figs. 7 and 8, in order to warm up the walls of the ice moulds 63, from the outside. Thus, in accordance with Fig. 7, a ventilator 66 can cause a warm air current 67 to envelop and finally defrost, all ice mould walls.

Consequent the defrosting of the iceblock 41 from the evaporator walls, and the thawing free from the mould, the ice block will slide down under gravity.

(d) Harvesting process

Fig. 12 illustrates the harvesting of ice blocks from the first mould battery, by means of a trolley table 71. Its table top had been lifted and raised to an extent that the sliding away ice blocks can readily deposit themselves thereon. It is then lowered, guided in the vertical guides 69a, and the group of ice blocks can finally be rolled away on the rails.

The long holes which remain within the ice block, due to the internal evaporator tubes, can be filled up directly after the taking off of the blocks. The ice blocks, having been produced at temperatures well under zero, keep cool to such a degree that in all cases the small amounts of liquid additionally to be frozen in said holes, can freeze up without requiring a separate freezing process.

In certain cases, it can be of advantage to utilize the tubes of the internal evaporators, which as was described above will directly upon the emergence of the iceblocks become cooled again in a renewed freezing process, as pre-cooled guide rods to lead the refill liquid into the long holes disposed directly underneath in the ice blocks on the table on which they are resting after the harvesting action.

The ice generating plant has been described as operating substantially automatically. It is of course, possible to extend the automatic operation or else, to employ manual operation, or different kinds of electrical control.

The ice block generation is, in larger plants, done in a way that at any one period only one mould battery is in its defrosting or harvesting process. This battery will then support the converting into liquid form of the used refrigerant medium, i. e. it will act as an auxiliary condenser for the plant and for the remaining mould batteries still in the freezing process, resulting in the advantage that also in such larger plants, a condenser of relatively small dimension can be employed.

I claim:

1. An ice-making machine including at least one upright ice mould with removable bottom adapted to be held against the mould by an intervening ice film; at least one tubular freezing member extending from above into the mould substantially over the entire height of the latter; a freezing jacket surrounding at least a part of the mould and connected to the tubular freezing member; and means for passing in succession through the tubular freezing member and freezing jacket a refrigerating medium adapted to produce an ice block in the mould, and in alternation therewith a warm medium adapted to detach the ice block from the mould.

2. An ice-making machine as claimed in claim 1, including springy means adapted to apply the mould bottom from below against the mould; means for guiding the bottom downwards under the action of the elongation of the ice block forming in the mould, and means adapted to enable the bottom to swing sidewards under the impact of the detached ice block.

3. An ice-making machine as claimed in claim 2, wherein the mould bottom is swingably mounted on a horizontal axle vertically displaceable in guiding means provided beneath the mould laterally thereof; and springy means are provided in conjunction with said guiding means for pushing the axle upwards within the guiding means.

4. An ice-making machine as claimed in claim 1, wherein the freezing jacket surrounds only the lower part of the ice mould and is connected to the tubular freezing element by at least one pipe disposed along the outer surface of the mould.

5. An ice-making machine as claimed in claim 1, including a plurality of ice moulds and a common freezing jacket surrounding all the moulds; a stand supporting the moulds and jacket with a clearance therebeneath; a removable trolley adapted to be disposed in said clearance and to collect the ice blocks detached from the mould; and means for centering the trolley with relation to the stand.

6. An ice-making machine as claimed in claim 5, wherein the trolley includes a loading surface adapted to be raised and lowered.

7. An ice-making machine as claimed in claim 5, wherein the trolley includes a loading surface and a curved guideway projecting upwards from one end of the loading surface and adapted to guide down onto the latter the ice blocks detached from the moulds.

8. An ice-making machine as claimed in claim 7, wherein the guideway has a substantially parabolic curvature.

9. An ice-making machine including a plurality of upright ice moulds provided with removable bottom adapted to be held on the moulds by an intervening ice film; a refrigerant feed system including at least one overhead feed pipe and at least one freezing tube branched off from the overhead feed pipe at the place of each mould and extending into the latter substantially over the entire height thereof; a common jacket surrounding the lower parts of all the moulds; a refrigerant transfer system including at least one overhead pipe connected to the jacket, and as many vertical transfer tubes branched off from the overhead transfer pipe as there are freezing tubes, each vertical transfer tube coaxially surrounding one freezing tube in spaced relation thereto and being closed at its bottom and slightly beneath the lower end of the freezing tube; an exhaust system connected to the jacket; and thermostatically controlled electrically operated valves in the said feed and exhaust systems for the regulation of the alternating supply of cold and hot refrigerant in succession through the feed, transfer and exhaust systems.

10. A method of producing ice in an upright mould provided with a detachable bottom, wherein water is cooled in the mould by means of a refrigerating medium acting by exchange of heat on the water from within the latter over substantially the whole height thereof and from outside over a relatively narrow zone immediately above the bottom, the refrigerating medium being brought to exchange of heat with the water both within the latter and outside thereof in the bottom region.

11. A method of producing ice in an upright mould provided with detachable bottom, wherein water is cooled in the mould by means of a refrigerating medium acting by exchange of heat on the water from within the latter over substantially the whole height thereof, and from outside over a relatively narrow zone above the bottom, the refrigerating medium being first passed through the mould and introduced into said zone outside the mould along the bottom zone thereof, thereby making the bottom adhere to the mould by freezing, and the full calculated quantity of water to be frozen being then introduced into the mould and frozen.

12. A method of producing ice in an upright mould provided with detachable bottom, wherein water is cooled in the mould by means of a refrigerating medium acting by exchange of heat on the water from within the latter over substantially the whole height thereof, and from outside over a relatively narrow zone immediately above the bottom, the refrigerating medium being brought to exchange of heat with the water both within the latter and outside thereof in the bottom region, the produced ice being thawed off by bringing a current of hot refrigerating medium to exchange of heat with the ice first inside the mould and thereafter outside thereof in the bottom region.

References Cited in the file of this patent

UNITED STATES PATENTS

| | | |
|---|---|---|
| 186,589 | Lucas | June 23, 1877 |
| 191,256 | Riker | May 29, 1877 |
| 236,471 | Windhausen | Jan. 11, 1881 |
| 989,044 | Pool | Apr. 11, 1911 |
| 1,719,987 | Mayall | July 9, 1929 |
| 2,149,912 | Fuss | Mar. 7, 1939 |
| 2,181,898 | Kastler | Dec. 5, 1939 |
| 2,405,273 | Smith | Aug. 6, 1946 |
| 2,529,734 | Lehmann | Nov. 14, 1950 |
| 2,585,240 | Grow | Feb. 12, 1952 |
| 2,590,499 | Braswell | Mar. 25, 1952 |